United States Patent [19]

Macon

[11] Patent Number: 4,936,335

[45] Date of Patent: Jun. 26, 1990

[54] DEVICE FOR MIXING FERTILIZER FROM FERTILIZER STICKS WITH WATER FOR USE IN A SPRINKLING SYSTEM

[76] Inventor: Hal H. Macon, 607 Watson St., Hawkinsville, Ga. 31036

[21] Appl. No.: 365,725

[22] Filed: Jun. 14, 1989

[51] Int. Cl.[5] .......................... B01F 1/00; A01X 23/00

[52] U.S. Cl. ...................................... 137/268; 422/261

[58] Field of Search ................ 137/268; 422/269, 261, 422/270, 271, 272, 273, 275; 239/310

[56] References Cited

U.S. PATENT DOCUMENTS 1,321,586 11/1919 Bachman ........................ 137/268 X 1,747,834 2/1930 Linck .................................. 422/269

3,199,957 8/1965 Vivion ............................ 137/268 X 3,460,562 8/1969 Moulder ............................. 137/268

4,340,179 7/1982 Knapp ................................ 229/310

4,634,053 1/1987 Herzfeld .......................... 137/268 X

*Primary Examiner*—Alan Cohan

*Attorney, Agent, or Firm*—Terry M. Gernstein

[57] ABSTRACT

A device for containing fertilizer sticks and which is fluidically interposed between a source of water and a sprinkling system permits fertilizer from the fertilizer sticks to be controllably and uniformly dispersed by the sprinkling system. The device includes a filter and a fluid swirling element.

1 Claim, 2 Drawing Sheets

DEVICE FOR MIXING FERTILIZER FROM FERTILIZER STICKS WITH WATER FOR USE IN A SPRINKLING SYSTEM

TECHNICAL FIELD OF THE INVENTION

The present invention relates to the general art of fluid mixing, and to the particular field of devices for mixing and dispensing fertilizer.

BACKGROUND OF THE INVENTION

Many homeowners and gardeners find it advantageous and necessary to dispense fertilizer material on the grass or plants in their lawn or garden. Fertilizer is available in dry form or in liquid form, and many people prefer one form over another for various applications and reasons.

Accordingly, there are several devices for dispensing liquid fertilizer and several devices for dispensing dry fertilizer known in the art.

Still further, many homeowners and/or gardeners have found it to be advantageous and efficient to combine the process of dispensing fertilizer with a watering process. For this reason, the art also contains several devices for mixing liquid fertilizer with water during a watering process.

However, many people feel that in specific instances, dry fertilizer achieves results that are superior to those results achievable by using liquid fertilizer, and therefore prefer to use dry fertilizer in such instances. Dry fertilizer is available in granular form, and in the form of fertilizer sticks. Fertilizer sticks are generally formed by compacting and binding dry fertilizer into elongated, cylindrical bodies.

More specifically, many people preferring dry fertilizer prefer the results obtained using fertilizer sticks even to the results obtained using dry fertilizer in granular form.

Fertilizer sticks are generally applied to a lawn or to a garden by driving the sticks into the ground at various locations in the lawn or garden. This is a localized process, and many people might prefer to apply fertilizer from fertilizer sticks to the overall lawn or garden.

Since the dispersal of water onto a lawn or a garden is often carried out using a sprinkler system it would appear to be advantageous to combine such watering process with the dispersal of fertilizer from fertilizer sticks.

However, the inventor is not aware of any device which efficiently permits the controlled dispersement of fertilizer from fertilizer sticks via a watering or sprinkling system. Therefore, there is a need for such a device.

OBJECTS OF THE INVENTION

It is a main object of the present invention to provide a device that permits the dispersement of fertilizer from fertilizer sticks using a watering or sprinkling system.

It is another object of the present invention to provide a device that permits the dispersement of fertilizer from fertilizer sticks using a watering or sprinkling system that is controllable so that only the proper amount of fertilizer is disbursed.

It is another object of the present invention to provide a device that permits the dispersement of fertilizer from fertilizer sticks using a watering or sprinkling system in a manner that will not clog the sprinkling or watering system.

SUMMARY OF THE INVENTION

These, and other, objects are achieved by a device that is fluidically interposed between a source of water and a sprinkler or other fluid dispersing means, with the device including a chamber for containing fertilizer sticks, and control means for controlling the dispersement of the fertilizer into the water flowing through the device. A filter means is also included so that granules from the fertilizer sticks will not clog the dispersing means.

Since the size of the granules in dry fertilizer in granular form can be closely controlled, devices that operate with granular dry fertilizer are not subject to clogging because the size of the granules can be controlled to be less than the size of the openings used in the dispersing system. However, in the case of fertilizer sticks, such granule size control is not possible because the size of the granules will be dictated be the fluid mechanics and the binding mechanics associated with flowing water past a fertilizer stick and having some of that stick break off and flow into the water to be dispersed by the system. It is Possible for a large "chunk" of the fertilizer stick to break off and thus clog the system. Accordingly, a device used in conjunction with fertilizer sticks is subject to entirely different considerations and constraints than a simple device intended to operate with granular fertilizer. For this reason, the device of the present invention includes a filter means for preventing the clogging of a sprinkler or other water dispersing means by large "chunks" from the fertilizer sticks.

Still further, the device of the present invention includes a means for increasing the swirling action of the water passing therethrough. Again, if a device is used in conjunction with granular product, the grain size of the product can be selected to ensure complete mixing of the product in the water passing through the device. However, in the case of fertilizer sticks, such assurance is not present since there is an additional factor associated with the binding mechanics of the fertilizer stick that must be accounted for. Accordingly, the device of the present invention includes a means for ensuring a complete and thorough mixing of the water about the fertilizer sticks in the device.

DESCRIPTION OF THE DRAWING FIGURES

DETAILED DESCRIPTION OF THE PREFERRED EMBODIMENT OF THE INVENTION

Figure 1:
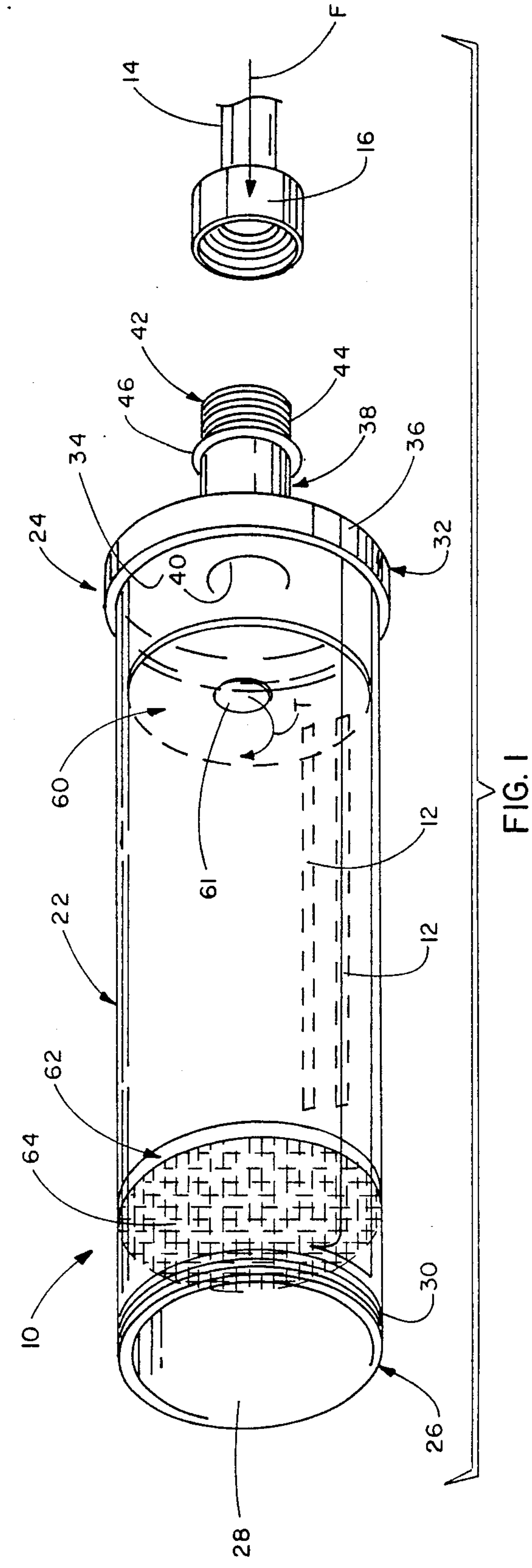
FIG. 1 is a perspective view of a device for mixing fertilizer from solid fertilizer sticks with water in a watering system as embodying the present invention.
Figure 2:
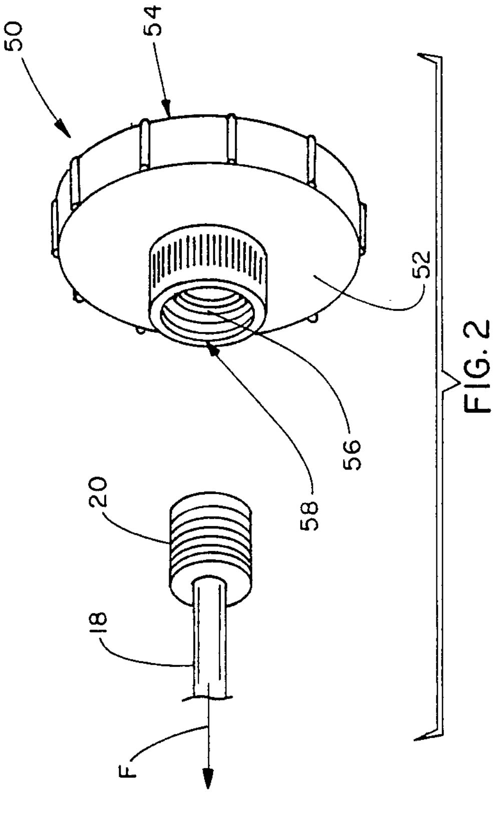
FIG. 2 is a perspective view of an end cap of the device of the present invention.

Shown in FIG. 1 is a device 10 mixing fertilizer from solid fertilizer sticks, such as fertilizer sticks 12, with water that is used to water a lawn or a garden via a sprinkling system, or the like. The water is supplied from a source (not shown) via a hose 14 having a female connector 16. It is noted that the connector 16 is shown as being a female connector, but could be a male connector, as might be the usual case, without departing from the scope of the present invention. The female connector is shown for the sake of convenience only, and not for the sake of limitation.

Water from the hose 14 is supplied to the device 10, and is mixed with dry fertilizer from the fertilizer sticks 12 in the device 10, and is then sent to a sprinkler system (not shown) via a hose 18 connected to the device via a male connector 20. Again, the connector 20 can be a female connector without departing from the scope of the present invention.

For the sake of convenience, the flow direction of water through the device 10 is indicated in the figures by the arrows F and is taken as from hose 14 to hose 18, with terms such as "upstream", "downstream", "inlet" and "outlet" being taken in reference to the flow direction F.

The device 10 includes a cylindrical, hollow body 22 that is translucent so that a user can see the state of the fertilizer sticks 12 and change them when necessary. The body 22 has an inlet end 24 and an outlet end 26 and has a bore 28 defined axially therethrough. External threads, such as thread 30 on outlet end 26, are defined in the outer surface of the body. The body 22 is formed of tough, water resistant material, such as plastic or the like, and has a length that exceeds the usual length of a fertilizer stick, and a diameter that is sufficient to define the bore 28 to be large enough to hold a multiplicity of fertilizer sticks.

The device 10 further includes an inlet cap 32 which fits over the inlet end of the bore 28 as shown in FIG. 1 in covering relation thereto. The cap includes a body 34 and an annular flange 36 extending from that body around the perimeter thereof. The flange includes a thread on the inside surface thereof, and that internal thread co-operates with the external thread on the body 22 to threadably couple the inlet cap to the body as shown in FIG. 1 to have the body 34 of the inlet cap held in covering relation to the bore 28.

The inlet cap 24 further includes an inlet nipple 38 connected to the body 34 around an inlet opening 40 defined in that cap to have an outlet end thereof fluidically connected to the interior of the bore via the inlet opening 40, and an inlet end 42 having external threads 44 that co-operate with the internal threads on the coupling 16 to fluidically connect the nipple to the hose so that water from the hose flows into the bore 28 via the nipple and the inlet opening 40. A flange 46 is also included to ensure proper seating of the coupling 16 on the nipple 38.

The device 10 further includes an outlet cap 50 that covers the outlet end 26 of the body 22. The outlet cap 50 is similar to the inlet cap, and includes a body 52 that is sized and configured to cover the bore 28 and has an annular flange 54 extending therefrom around the perimeter thereof. The flange 54 includes internal threads on an inside surface thereof which cooperate with the external threads 30 on the outlet end of the body 22 to threadably couple the outlet cap to the body in covering relation to the bore 28.

The outlet cap body 52 includes an outlet port 56 defined therein and a coupling 58 surrounding such outlet port. The coupling 58 includes internal threads 60 which co-operate with the external threads on the hose coupling 20 to fluidically connect the hose 18 to the bore 28 via the coupling 58 and the outlet port 56 to receive fluid from that bore and send that fluid on to the sprinkler system via the hose 18 in the flow direction F.

The device 10 is used by placing a multiplicity of fertilizer sticks 12 in the bore 28, closing that bore to form a chamber by coupling the inlet cap and the outlet cap on the ends of the body, and fluidically interposing it between the source of water and the sprinkler system by coupling it between the hoses 14 and 18. Once the water is turned on at the source, this water will flow in the direction F from hose 14 into the chamber containing the fertilizer sticks, flow past such sticks and removing fertilizer from such sticks due to the interaction of the flowing water and the sticks, and then transporting such removed fertilizer out of the chamber via the outlet opening 56 and into the hose 18 via the couplings 58 and 20 to be sent to the sprinkler system for dispersal by that sprinkler system.

As above discussed, since the fertilizer sticks 12 are formed of compressed granules that are held together by a binder, simply moving water rapidly by such sticks may not disperse the fertilizer in a manner that is controlled sufficiently for proper dispersing of fertilizer. In other words, some areas may receive too much fertilizer, and other areas not enough, depending on the varies of the unbinding process under the influence of the water passing through the chamber. Still further, some of the pieces removed from the sticks may be large enough to clog the sprinkler outlet openings. Therefore, the device 10 includes a flow control means for ensuring proper removal of the grains of fertilizer from the fertilizer sticks and means for preventing large pieces of such sticks from entering the hose 18.

The flow control means includes a device 60 located inside the bore downstream of and adjacent to the inlet end 24 of the body. The device 60 includes an orifice 61 and causes the water entering the bore from the inlet port to swirl in a cyclone-like manner as indicated in FIG. 1 by the arrow T which extends helically from the device 60 downstream toward the body outlet end 26 and is located near the longitudinal centerline of the cylindrical body 22. The cyclonic action of the water entering the area of the chamber containing the fertilizer sticks ensures a turbulent motion of the water adjacent to the fertilizer sticks and ensures that all of the sticks, even those on the outside, adjacent to the body, will receive a swirling action from the water passing through the body. This will ensure that all of the sticks are exposed to turbulent water in an essentially even manner so that all sticks will be dissolved essentially uniformly and all areas of each stick will receive essentially the same mixing action of the water.

There are several devices that can be used for the device 60, such as a propeller-like device having a propeller that is shaped and designed similar to a boat propeller and which will be rotated by the water flowing longitudinally thereagainst and therepast. Suitable propeller designs will occur to those skilled in the art based on the teaching of this disclosure and from texts such as *Marks' Standard Handbook for Mechanical Engineers*, seventh edition published by McGraw-Hill Book Company in 1967, especially Section 11 thereof, the disclosure of which is incorporated herein by reference.

Figure 3:
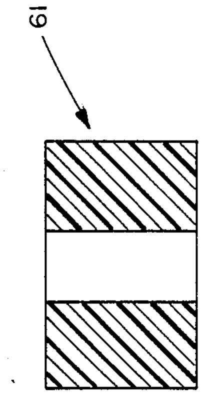
FIG. 3 is a sectional elevational view of one form of an axially elongated venturi used in the device of the present invention.
Figure 4:
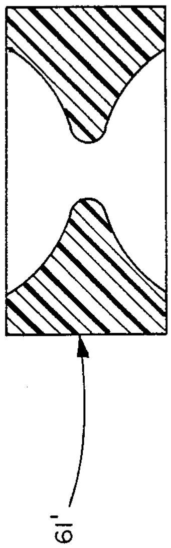
FIG. 4 is a sectional elevational view of a second form of an axially elongated venturi used in the device of the present invention.

Another device that is suitable for use as the device 60 is an axially elongated constricted venturi such as disclosed in U.S. Pat. 4,625,780, the disclosure of which is incorporated wherein by reference, and shown in FIGS. 3 and 4 at 61 and 61' respectively. As defined in the incorporated patent, an axially elongated venturi is a venturi which is, at least in part, axially thicker than its opening or width. This patented device causes a rapid, tornado-like motion to be imparted to fluid passing therethrough, and can be used as device 60 in device 10 by simply installing such device inside the bore 28, and then manually swirling the overall device 10 in direction T as the water begins to flow into the bore 28 from the inlet port 40. The manual swirling will establish the cyclone effect, and then, once established, such cyclone will be self-sustaining. The cyclonic action of the fluid will occur in the chamber adjacent to the fertilizer sticks.

The filter means used to ensure that large "chunks" of fertilizer product do not reach the sprinkler system, includes a screen device 62 located downstream of the fertilizer sticks and between such sticks and the outlet port 56 to intercept such large chunks of fertilizer material. The cyclonic action of the water passing through the chamber will serve to wash screen 64 of the device and prevent the large chunks of material from remaining in place and thereby clogging the system at the filter. However, since the body 22 is translucent, the user can see the screen and determine if it is being clogged, and take appropriate action by backwashing the system or removing the filter means and cleaning it manually, or the like. The size of the screen mesh will be known to those skilled in the art based on the guidance provided by this disclosure and by knowledge from references such as the Marks' Handbook cited above (see page 7-83, the disclosure of which is incorporated herein by reference).

It is understood that while certain forms of the present invention have been illustrated and described herein, it is not to be limited to the specific forms or arrangements of parts described and shown.

What is claimed:

1. A device for mixing fertilizer from solid fertilizer sticks with water for dispersal on lawns, gardens and the like via a sprinkling system, comprising:

(A) a hollow cylindrical housing which includes
  (1) a translucent wall having an inlet end and an outlet end and having a bore defined axially therethrough, and
  (2) exterior screw threads on an outside surface of said wall adjacent to said inlet end and adjacent to said outlet end;

(B) an inlet cap on said housing inlet end, said inlet cap including
  (1) a body covering said housing inlet end, said body including an inlet port fluidically coupled to said housing bore,
  (2) an annular flange on said body and having screw threads thereon co-operating with said housing inlet end screw threads to couple said inlet cap to said housing wall, and
  (3) an inlet nipple mounted at an outlet end thereof on said inlet cap body adjacent to said body inlet port and having exterior screw threads on an inlet end thereof for fluidically coupling a source of fluid to said housing bore via said inlet port;

(C) an outlet cap on said housing outlet end and including
  (1) a body covering said housing outlet end and having an outlet port defined therein to be in fluid communication with said housing bore,
  (2) an annular flange on said outlet cap body and having screw threads co-operating with said housing outlet and screw threads and coupling said outlet cap to said housing,
  (3) an outlet coupling on said outlet cap adjacent to said outlet port and having internal screw threads on an outlet end thereof for fluidically coupling said housing bore to a sprinkling system via said outlet cap outlet coupling;

(C) a fluid swirling means mounted on said housing in said bore adjacent to said inlet end and imparting cyclonic motion to water flowing into said bore from said inlet end, said fluid swirling means consisting entirely of
  (1) planar plate mounted on said housing body adjacent to said inlet end, and
  (2) an axially elongated constriction venturi defined through said planar plate at the center of said planar plate;

(D) a filter means mounted on said housing in said bore adjacent to said outlet end and filtering fluid from said bore before said fluid reaches said outlet cap, said filter means including a mesh screen.

* * * * *